United States Patent [19]

Birk

[11] 4,008,768
[45] Feb. 22, 1977

[54] OIL RECOVERY BY WATERFLOODING EMPLOYING MULTICOMPONENT SURFACTANT SYSTEMS

[75] Inventor: Silvia C. Birk, Fort Worth, Tex.

[73] Assignee: Mobil Oil Corporation, New York, N.Y.

[22] Filed: Mar. 20, 1975

[21] Appl. No.: 560,289

[52] U.S. Cl. .......................... 166/274; 252/8.55 D
[51] Int. Cl.$^2$ ........................................ E21B 43/22
[58] Field of Search ................. 166/274, 275, 273; 252/8.55 D, 545

[56] References Cited

UNITED STATES PATENTS

| 3,096,820 | 7/1963 | Bernard | 166/275 |
| 3,332,486 | 7/1967 | McGhee | 166/274 |
| 3,455,386 | 7/1969 | Reisburg | 252/8.55 D |
| 3,474,864 | 10/1969 | Hurd | 166/273 |
| 3,578,781 | 5/1971 | Abrams et al. | 252/8.55 D |
| 3,792,731 | 2/1974 | Feuerbacher et al. | 166/274 |
| 3,811,504 | 5/1974 | Flournoy et al. | 166/274 |
| 3,811,505 | 5/1974 | Flournoy et al. | 166/274 |

OTHER PUBLICATIONS

Pittaway, "The Effects on Interfacial Tension of Aging of the Surfactants IGEPAL CO–520 and IGEPON T–33," Sept. 3, 1974.
Schwartz and Perry, "Surface Active Agents," Interscience Publishers, 1949, pp. 326, 327.
"McCutcheon's D&E", 1970, p. 127.

*Primary Examiner*—Ernest R. Purser
*Attorney, Agent, or Firm*—C. A. Huggett; William D. Jackson

[57] ABSTRACT

A process for the recovery of oil from subterranean oil reservoirs by waterflooding employing an anionic-nonionic surfactant system which is particularly suitable for use in reservoirs in which the connate waters contain a high salt content, including divalent metal salts, or which may be employed in carrying out waterfloods in which the available injection waters exhibit a relatively high salt content. The multifunctional surfactant system comprises a surface-active amide linked sulfonate anionic group and a surface-active polyethylene oxide nonionic group and may be employed in an aqueous solution having a salinity within the range of 3 to 25 weight percent. Subsequent to the injection of the aqueous solution of surfactant, an aqueous flooding medium may be injected which exhibits a salinity which is lower than the salinity of the surfactant slug.

21 Claims, 11 Drawing Figures

OIL RECOVERY BY WATERFLOODING EMPLOYING MULTICOMPONENT SURFACTANT SYSTEMS

BACKGROUND OF THE INVENTION

This invention relates to the recovery of oil from subterranean oil reservoirs and more particularly to improved waterflooding operations involving the injection of multifunctional anionic-nonionic surfactant systems which are compatible with high salinities and high concentrations of divalent metal ions.

In the recovery of oil from oil-bearing reservoirs, it usually is possible to recover only minor portions of the original oil in place by the so-called primary recovery methods which utilize only the natural forces present in the reservoir. Thus a variety of supplemental recovery techniques have been employed in order to increase the recovery of oil from subterranean reservoirs. The most widely used supplemental recovery technique is waterflooding which involves the injection of water into the reservoir. As the water moves through the reservoir, it acts to displace oil therein to a production system composed of one or more wells through which the oil is recovered.

It has long been recognized that factors such as the interfacial tension between the injected water and the reservoir oil, the relative mobilities of the reservoir oil and injected water, and the wettability characteristics of the rock surfaces within the reservoir are factors which influence the amount of oil recovered by waterflooding. Thus it has been proposed to add surfactants to the flood water in order to lower the oil-water interfacial tension and/or to alter the wettability characteristics of the reservoir rock. Also, it has been proposed to add viscosifiers such as polymeric thickening agents to all or part of the injected water in order to increase the viscosity thereof, thus decreasing the mobility ratio between the injected water and oil and improving the sweep efficiency of the waterflood.

Processes which involve the injection of aqueous surfactant solutions in order to reduce the oil-water interfacial tension are commonly referred to as low tension waterflooding techniques. Thus far, most low tension waterflooding applications have employed anionic surfactants. For example, a paper by W. R. Foster entitled "A Low-Tension Waterflooding Process", JOURNAL OF PETROLEUM TECHNOLOGY, Vol. 25, Feb. 1973, pp. 205-210, describes a promising technique involving the injection of an aqueous solution of petroleum sulfonates within designated equivalent weight ranges and under controlled conditions of salinity. The petroleum sulfonate slug is followed by a thickened water slug which contains a viscosifier such as a water-soluble biopolymer in a graded concentration in order to provide a maximum viscosity greater than the viscosity of the reservoir oil and a terminal viscosity near that of water. This thickened water slug is then followed by a driving fluid such as a field brine which is injected as necessary to carry the process to conclusion.

One limitation encountered in waterflooding with anionic surfactants such as petroleum sulfonates is the tendency of the surfactants to precipitate from solution in the presence of even moderate concentrations of divalent metal ions such as calcium and magnesium ions. Thus, as taught for example in the Foster paper, the surfactant slug may be preceded by a protective slug which functions to displace the reservoir waters ahead of the subsequently injected surfactant slug. Another limitation imposed upon the use of anionic surface-active agents resides in the fact that desired low interfacial tensions can seldom be achieved, even in the absence of divalent metal ions, at salinities significantly in excess of 2 to 3 weight percent. Thus, the protective slug as well as the surfactant slug normally will be of a relatively low salinity.

Surfactant adsorption poses a serious problem to the application of low tension waterflooding. To counter this, it has been proposed, as taught in the aforementioned paper by Foster and also in U.S. Pat. No. 3,474,864 to Hurd, to employ a surfactant slug having a salinity consistent with the desired low interfacial tension, then to follow the surfactant slug with a slug of a somewhat lower salinity in order to move the surfactant through the reservoir. In addition, as taught by these references, sacrificial agents such as sodium tripolyphosphate and/or sodium carbonate may be employed in order to decrease adsorption of the surfactant.

In addition to the use of anionic surfactants, it also has been proposed to carry out waterflooding employing nonionic surfactants, either alone or in combination with anionic surfactants. For example, U.S. Pat. No. 3,332,486 to McGhee discloses waterflooding employing a combination of nonionic and anionic surfactants which are said to be blended such that the hydrophilic-lipophilic balance of the surfactant slug is approximately the same as that associated with the crude oil-injection water system. Various weight ratios of anionic to nonionic surfactants in the system are disclosed within the range of about 6.5/3.5 to about 8.5/1.5.

Another low tension waterflooding process, employing anionic-nonionic surfactant systems in the presence of salt concentrations within the range of 0.5 to 15.0 percent by weight, is disclosed in U.S. Pat. No. 3,792,731 to Feuerbacher et al. Anionic surfactants proposed for use in the Feuerbacher et al. patent include petroleum sulfonates, alkyl sulfonates, alkyl sulfates, and sulfosuccinates. Nonionic surfactants suggested by the patentees include ethoxylated alkyl phenols, ethoxylated alcohols, polymers or copolymers of ethylene oxide and/or propylene oxide, ethoxylated thioethers, and ethoxylated amines. The desired surfactant concentration is said to be within the range of 0.5 to 2.5 percent by weight with the surfactant system containing about 20 to 50 percent by weight of the nonionic surfactant with the balance being the anionic surfactant.

A number of recent patents are directed to the use of anionic-nonionic surfactant systems in low tension waterfloods carried out in the presence of high divalent-metal ion concentrations. For example, U.S. Pat. No. 3,811,505 to Flournoy et al. discloses such a system for use in formations containing water having concentrations of divalent ions such as calcium and magnesium within a range of about 500 to about 9000 parts per million (0.05 to 0.9 weight percent). The nonionic surfactants employed in the Flournoy et al. process include polyethoxylated alkyl phenols in which the alkyl group has 5 to 20 carbon atoms and polyethoxylated aliphatic alcohols having from 5 to 20 carbon atoms. The surfactants are said to contain 6 to 20 polyethoxy groups. The anionic surfactants employed include alkyl sulfonates and phosphates having from 5 to 25 carbon atoms and alkylaryl sulfonates and phosphates having from 5 to 25 carbons in the alkyl groups. Both the anionic and nonionic surfactants may be employed in concentrations within the range of 0.05 to 5.0 percent with the ratio of anionic surfactant to nonionic surfactant being about 1/10 to about 10.

U.S. Pat. No. 3,811,504, also to Flournoy et al., is directed to a low tension waterflood process for use in environments exhibiting a polyvalent ion concentration of about 1500 to about 12,000 parts per million and which employs a three-component surfactant system containing two anionic surfactants and one nonionic surfactant. One of the anionic surfactants is an alkyl or alkylaryl sulfonate and the other anionic surfactant is an alkyl polyethoxy sulfate. The nonionic surfactant may be a polyethoxylated alkyl phenol or a polyethoxylated aliphatic alcohol as disclosed in the previously mentioned Flournoy et al. patent or it may take the form of a fatty acid dialkanolamide or a fatty acid monoalkanolamide in which the fatty acid contains from 5 to 20 carbon atoms. In this process as in the previously described Flournoy et al. patent, a thickening agent such as a polyacrylamide or polysaccharide may be added to the surfactant slug or to a subsequently injected slug. In addition the surfactant slug may be preceded by a sacrificial agent such as sodium polyphosphate or sodium carbonate.

SUMMARY OF THE INVENTION

In accordance with the present invention, there is provided a new and improved low tension waterflooding process employing an anionic-nonionic surfactant system which is particularly suitable for use in carbonate, as well as sandstone reservoirs, in which the connate waters contain a high salt content, including divalent metal salts, or which may be employed in carrying out waterfloods in which the available injection waters exhibit a relatively high salt content. In carrying out the invention there is injected into the reservoir via a suitable injection system an aqueous solution of a multifunctional surfactant system comprising a surface-active amide linked sulfonate anionic group and a surface-active polyethylene oxide nonionic group. The aqueous surfactant solution preferably has a salinity within the range of 3 to 25 weight percent. Subsequent to the injection of the aqueous solution of surfactant, an aqueous flooding medium is injected into the reservoir via the injection system in order to displace reservoir oil to a spaced production system from which the oil is recovered. Preferably, the salinity of at least a portion of the subsequently injected flooding medium exhibits a salinity which is lower than the salinity of the surfactant slug.

More specifically, in carrying out the invention, the surfactant system comprises a nonionic surfactant characterized by the formula

wherein R is an aliphatic group or an aliphatic substituted aryl group and $n$ is a number equal to or greater than 3, and the anionic surfactant is a disubstituted taurate characterized by the formula

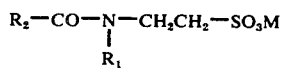

wherein $R_1$ is a methyl or ethyl group, $R_2$ is an aliphatic group containing 12 to 20 carbon atoms, and M is an alkali metal or ammonium ion. Preferably, the ethylene oxide content of the nonionic surfactant is within the range of 45 to 75 percent and more specifically within the range of 48 to 68 percent by weight. The disubstituted taurate preferably is selected from the group consisting of the alkali metal and ammonium N-methyl-N-oleoyl-taurates and the alkali metal and ammonium N-methyl-N-(tall oil acyl)-taurates.

DESCRIPTION OF SPECIFIC EMBODIMENTS

Figure 1:
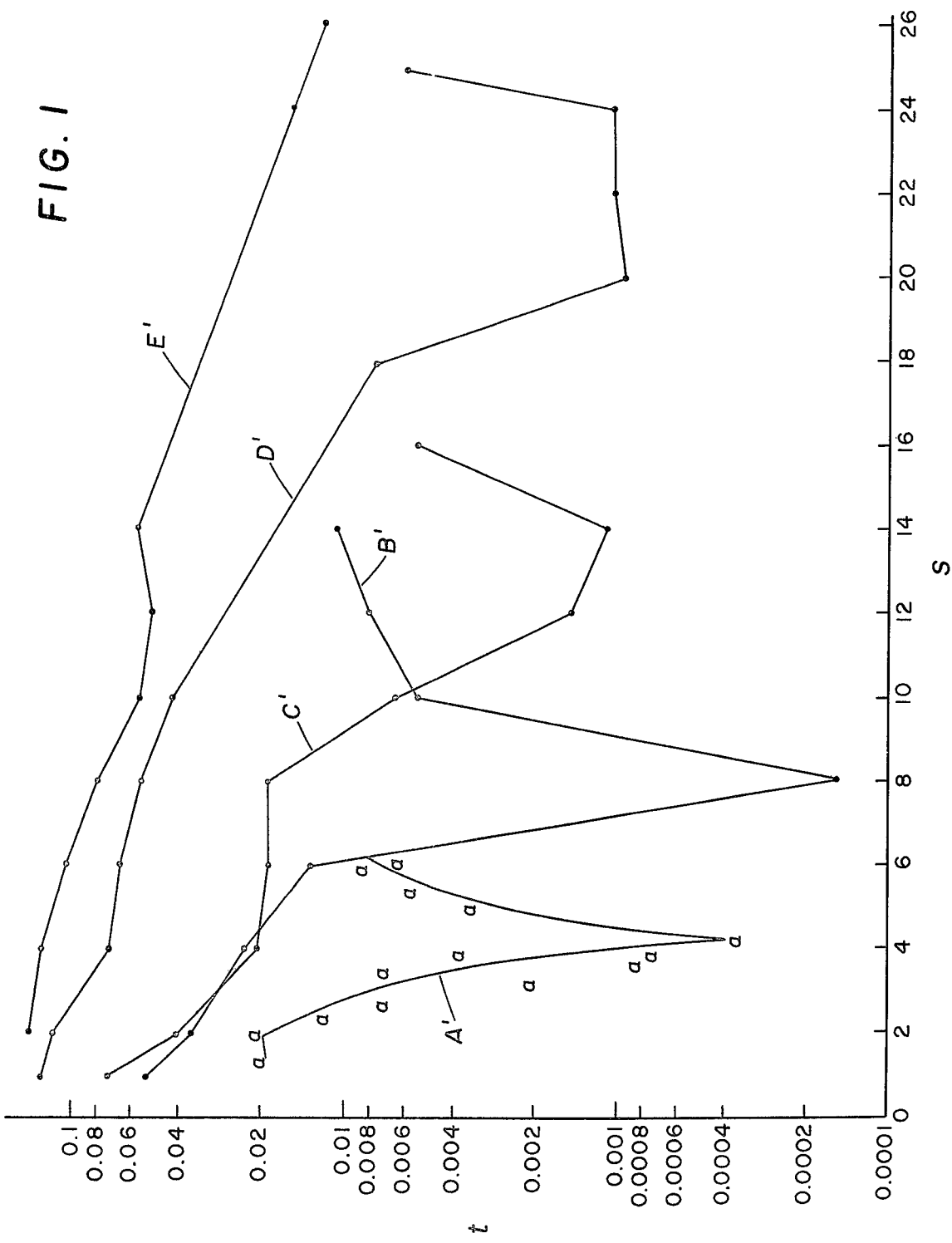
FIGS. 1 and 2 are graphs illustrating interfacial tensions achieved between oil and mixed brines containing divalent ions by employing the multicomponent surfactant systems of the present invention.

Low tension waterflooding procedures take advantage of the fact that by decreasing the interfacial tension between the injected flooding water and reservoir oil the microscopic displacement efficiency of the oil by the water is increased. All other things being equal, an increase in microscopic displacement efficiency is in turn accompanied by an increase in oil recovery. While theoretically any decrease in oil-water interfacial tension results in an increase in microscopic displacement efficiency, it is believed that most investigators would agree that this phenomenon ordinarily does not become significant until the oil-water interfacial tension is reduced to a value appreciably less than 0.1 dyne per centimeter. Preferably, the oil-water interfacial tension is reduced to a value of 0.003 dyne per centimeter or less in order to reach an "optimum" microscopic displacement efficiency.

By employing anionic surfactants such as petroleum sulfonates or synthetic alkyl aryl sulfonates, these extremely low interfacial tensions can be achieved in environments in which the monovalent salt salinity, principally sodium chloride, is relatively low. However, even moderate salinities, on the order of 3 percent by weight or more, normally preclude these low interfacial tensions. In addition, even small amounts of divalent ions will cause precipitation of the anionic surfactants, thus greatly reducing their effectiveness. When employing anionic surfactants, the divalent metal ion concentration normally should be less than 50 parts per million, and if it exceeds 300 to 500 parts per million the use of anionic surfactants alone is usually ineffective.

The present invention results from the discovery that by employing a multifunctional surfactant system comprising a mixture of certain nonionic surfactants and amide-linked sulfonates, low interfacial tensions can be achieved over a wide salinity range and in the presence of moderate to high divalent ion concentrations. The nonionic surfactants employed in the present invention are of the polyethylene oxide type in which the hydrophobic base is provided by an aliphatic group or an aliphatic substituted aryl group. The aliphatic groups or substituents may contain from 5 to 20 carbon atoms depending upon the polyethylene oxide content. The aryl component may be mononuclear or polynuclear (containing up to 3 rings) and will contain one or more aliphatic substituents. As a practical matter, the aryl component normally will be mononuclear simply from the standpoint of economy and product availability. The aliphatic group or aliphatic substituent may be unsaturated and/or contain branch chains but usually will take the form of normal alkyl groups.

The nonionic surfactants employed in the present invention and as described above may be characterized by the formula

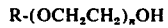

R-(OCH$_2$CH$_2$)$_n$OH where R is an aliphatic group or an aliphatic substituted aryl group and $n$ is a number equal to or greater than 3. It will be recognized that the nonionic surfactants of this nature are in themselves old and well known in the art and have been proposed for use in waterflooding either alone or in combination with sulfonate-type anionic surfactants as taught, for example, in the aforementioned patents to Flournoy et al.

The preferred amide-linked sulfonates employed in the present invention are disubstituted taurates of the type available from General Aniline and Film Corporation under the tradename "Igepon" and disclosed in U.S. Pat. No. 2,964,467 to Lambert et al. These are well known anionic surfactants and as disclosed in the aforementioned Lambert et al. patent may be added to industrial waters such as oil field brines in order to prevent scale formation. Disubstituted taurates employed in the present invention are characterized by the formula

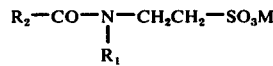

$R_2-CO-N-CH_2CH_2-SO_3M$
$\quad\quad\quad\;\;|$
$\quad\quad\quad R_1$ wherein $R_1$ is a methyl or ethyl group, $R_2$ is an aliphatic group containing 12 to 20 carbon atoms, and M is an alkali metal or ammonium ion. Preferred anionic surfactants for use in the invention are sodium N-methyl-N-oleoyl-taurate, available under the tradename "Igepon T-33", and sodium N-methyl-N-(tall oil acyl)-taurates, available under the tradename "Igepon TK-32".

To demonstrate the effect of total salinity (total dissolved solids content) and divalent metal ion concentration on the surfactant systems of the present invention, comparative laboratory experiments were carried out to determine the interfacial tensions between mixed brine solutions of different concentrations and crude oil for a number of nonionic surfactants alone and in mixture with a disubstituted taurates. Each test indicated that the multicomponent surfactant systems of the present invention achieved a lower minimum interfacial tension then the minimum interfacial tension observed for the corresponding nonionic surfactant alone. In every case but one, the minimum interfacial tension observed for the multicomponent systems was less than 0.003 dyne per centimeter. The nonionic surfactants employed in these tests are set forth in Table I and identified by a code letter, the tradename, and chemical formula. In addition, the hydrophilic-hydrophobic balance of each surfactant is expressed in terms of the percent ethylene oxide with the oxygen linkage to the hydrophobic base included in the polyethylene oxide chain.

TABLE I

| Code | Trade Name | Formula | % ETO |
|---|---|---|---|
| A | Igepal CO-430 | $C_9H_{19}C_6H_4O(CH_2CH_2O)_4H$ | 48.7 |
| B | Igepal CO-520 | $C_9H_{19}C_6H_4O(CH_2CH_2O)_5H$ | 53.8 |
| C | Igepal CO-530 | $C_9H_{19}C_6H_4O(CH_2CH_2O)_6H$ | 58.0 |
| D | Igepal CO-630 | $C_9H_{19}C_6H_4O(CH_2CH_2O)_9H$ | 67.0 |
| E | Igepal CO-710 | $C_9H_{19}C_6H_4O(CH_2CH_2O)_{10.5}H$ | 70.2 |
| F | Igepal CA-520 | $C_8H_{17}C_6H_4O(CH_2CH_2O)_5H$ | 55.6 |
| G | Igepal RC-520 | $C_{12}H_{25}C_6H_4O(CH_2CH_2O)_{6.5}H$ | 55.3 |
| H | Igepal RC-630 | $C_{12}H_{25}C_6H_4O(CH_2CH_2O)_{10}H$ | 65.1 |
| I | Igepal DM-530 | $(C_9H_{19})_2C_6H_3O(CH_2CH_2O)_9H$ | 55.6 |
| J | Igepal DM-710 | $(C_9H_{19})_2C_6H_3O(CH_2CH_2O)_{15}H$ | 67.3 |
| K | Emulphogene BC-610 | $C_{13}H_{27}O(CH_2CH_2O)_{6.5}H$ | 62.4 |

The various mixed brine solutions employed in the tests were prepared from a stock composition containing 19.3 weight percent* sodium chloride, 7.7 weight percent calcium chloride, and 3.0 weight percent magnesium chloride for a total salinity of 30.0 weight percent. The cation concentrations of the stock solution were 75,912 parts per million Na$^+$, 27,816 parts per million Ca$^{++}$ and 7,656 parts per million Mg$^{++}$. Thus, the total divalent metal ion concentration of the stock 30 percent brine solution was approximately 3.55 weight percent.

* In describing the present invention and the supporting laboratory data, weight percents are calculated on a weight (solute)/volume (solution) basis.

This stock solution was diluted as necessary to obtain mixed brine solutions ranging from a low salinity of 1.0 weight percent (0.64 weight percent sodium chloride and 0.12 weight percent divalent metal ions) to a high salinity of 28 percent (18.0 weight percent sodium chloride and 3.31 weight percent divalent metal ions). Surfactant solutions were then prepared employing mixed brine solutions of different total salinities, usually in total salinity increments of 2.0 weight percent, for each of the nonionic surfactants listed in Table I in a concentration of 0.02 weight percent in combination with 0.03 weight percent of Igepon T-33 (sodium N-methyl-N-oleoyl-taurate). The interfacial tensions of these several surfactant solutions were then measured against the same crude oil by the semimicro sessile drop procedure.

Figure 2:
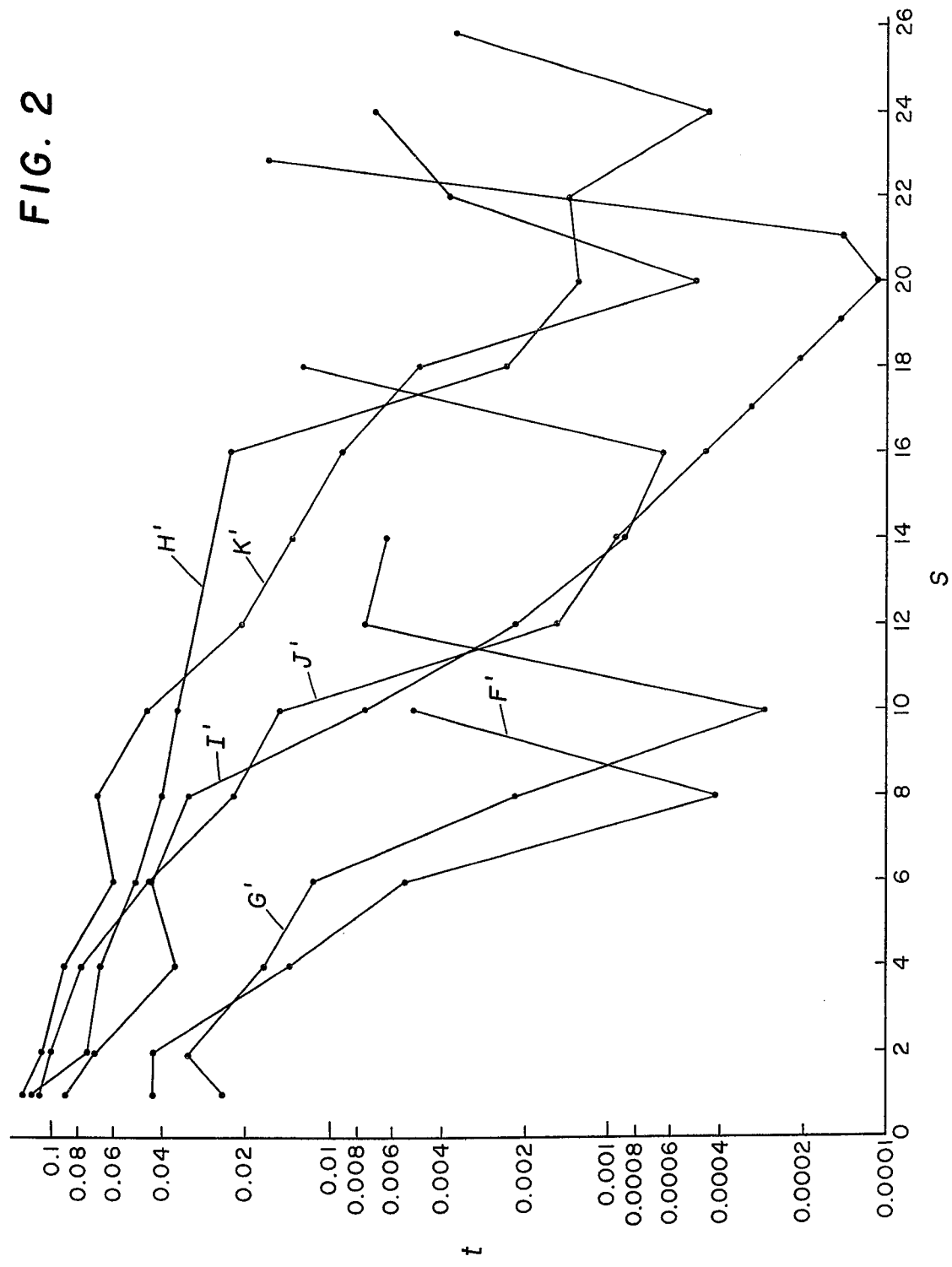

The results of this suite of experiments are illustrated in FIGS. 1 and 2 which are semilog plots of interfacial tension, t, in dyne/cm on the ordinate versus total salinity, S, in weight percent on the abscissa for the multicomponent surfactant systems employing the nonionic surfactants listed in Table I. The results for the multicomponent systems employing the nonionic surfactants identified by code letters A through E in Table I are illustrated in FIG. 1 by curves A' through E', respectively, and the results for the multicomponent systems employing surfactants identified by code letters F through J are illustrated in FIG. 2 by curves F' through J', respectively. In FIGS. 1 and 2, the curves are drawn through the data points with no attempt at interpolation except in the case of curve A' which was "smoothed" to accommodate a scattering of data points (indicated by $a$). For each of the surfactant systems illustrated, interfacial tensions were measured at total salinities of 1 percent, 2 percent and, except in the case of the systems employing surfactants A and J, increments thereafter of 2 percent up to the maximum point indicated.

From an examination of FIGS. 1 and 2, it can be seen that for each surfactant system, except for the system employing surfactant E, an interfacial tension of less than 0.003 dyne per centimeter was achieved. In general, the salinity at which the minimum interfacial tension occurred increased with the polyethylene oxide content. Also the "salinity window", i.e. the salinity range through which an interfacial tension of 0.003 dyne per centimeter or less occurred, is shown to increase generally with the polyethylene oxide content.

Another suite of experiments were carried out to determine the interfacial tensions between mixed brine solutions of nonionic surfactants alone against the same crude oil as used in the previously described experiments. These experiments were carried out for the anionic surfactant employed (Igepon T-33) and also the nonionic surfactants identified in Table I as A, C, D, E, G, H, I, J, and K. Meaningful measurements were not obtained for surfactants A, G, and I, primarily due to turbidity of the solution. For surfactant J only one data point was obtained (0.93 dyne/centimeter at 1 percent total salinity) and for the anionic Igepon T-33 only two data points were obtained (0.078 and 0.036 dyne/cm at 4 and 6 percent total salinity) before this solution became turbid because of precipitation of the anionic surfactant.

Figure 3:
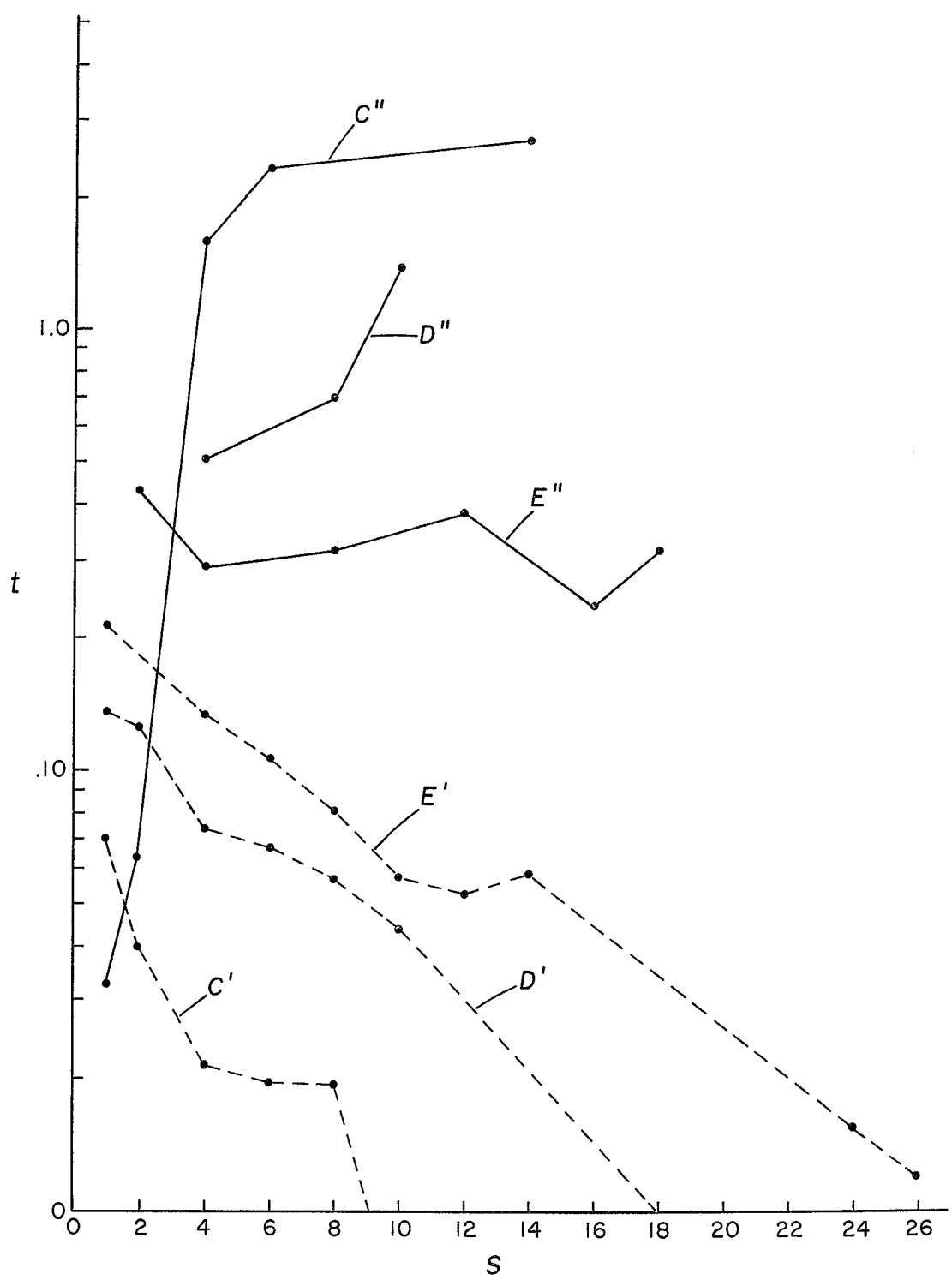
FIGS. 3, 4, and 5 are graphs illustrating the comparative interfacial tensions achieved by employing certain nonionic surfactants alone and in multicomponent surfactant systems of the present invention.
Figure 4:
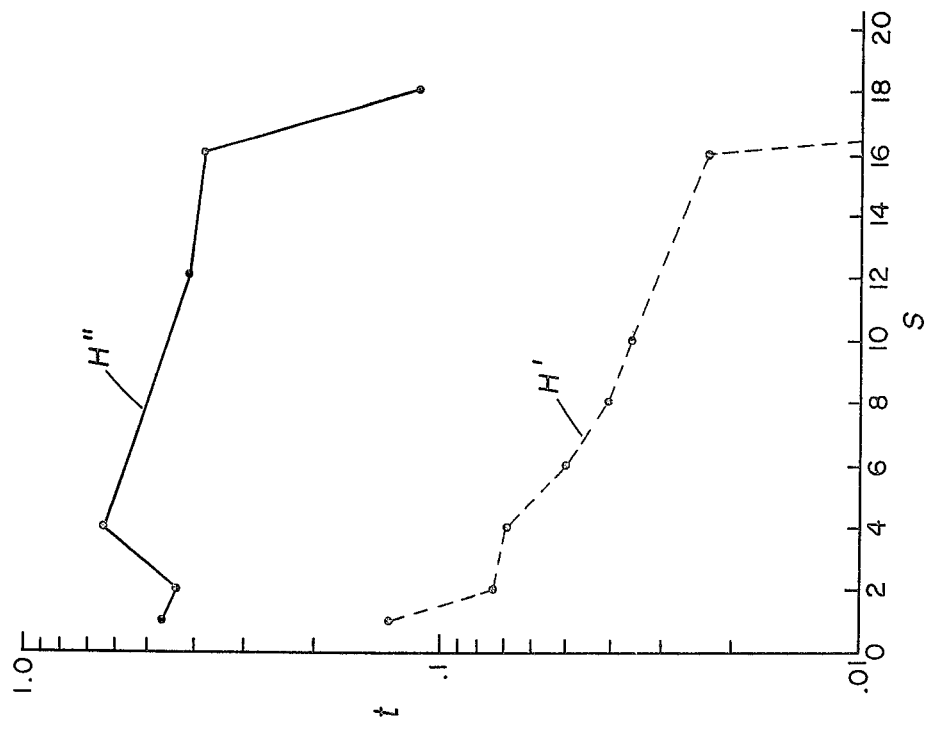
Figure 5:
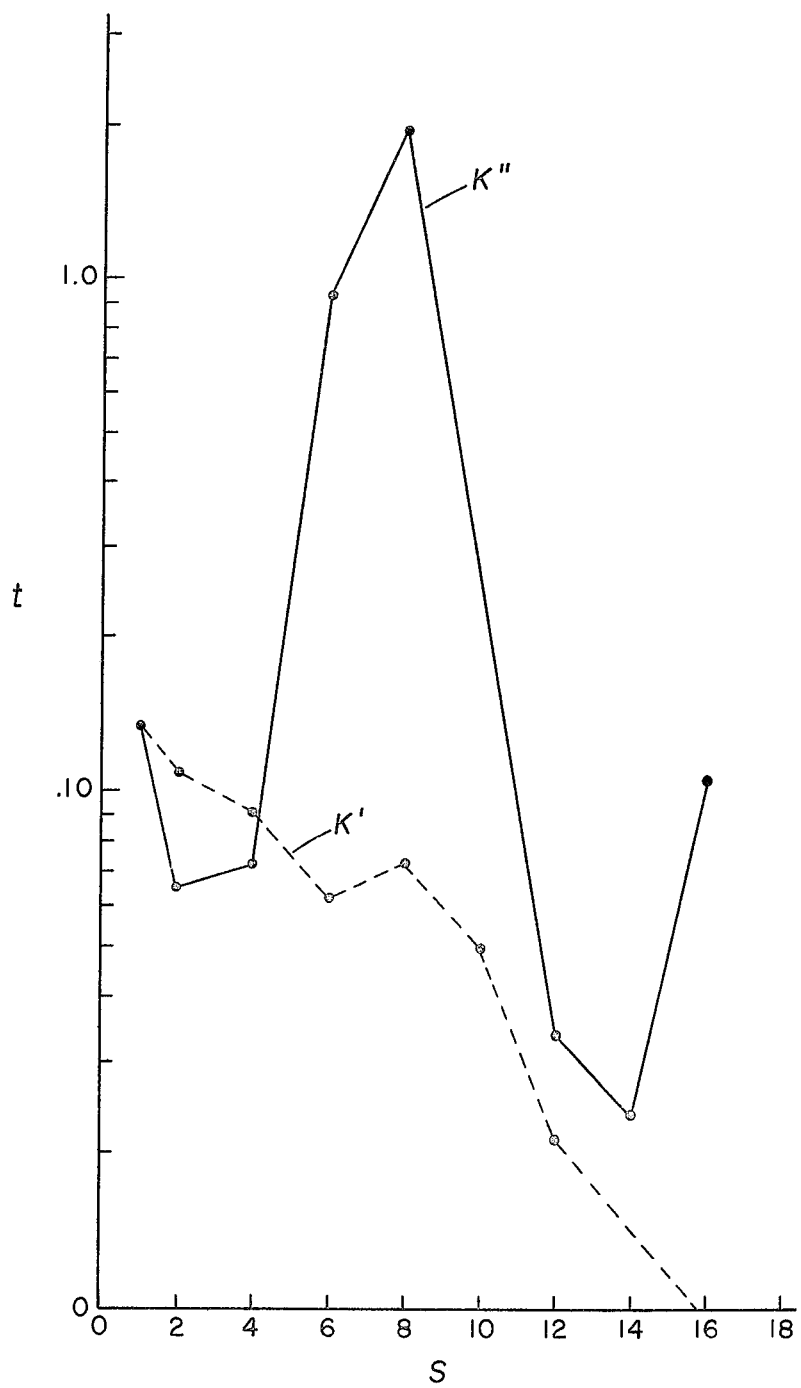

The results obtained for the interfacial measurements taken with respect to the remaining nonionic surfactants are illustrated in FIGS. 3, 4, and 5 which are plots of the log of interfacial tension, t, in dyne/cm on the ordinate versus the total salinity, S, in weight percent on the abscissa. In FIG. 3, curves C", D", and E" show the interfacial tensions obtained for 0.02 weight percent solutions of surfactants C, D, and E, respectively, versus total salinity. In addition, in FIG. 3, portions of curves C' and D', and all of curve E' from FIG. 1 are reproduced in order to indicate the amount of interfacial tension reduction achieved by using the anionic disubstituted taurate in combination with the nonionic surfactant. FIGS. 4 and 5 show similar data for surfactants H and K, respectively. Thus, curve H" in FIG. 4 and curve K" in FIG. 5 illustrate the interfacial tensions observed for 0.02 weight percent for solutions of surfactants H and K, respectively, without the addition of the anionic Igepon T-33 and curves H' and K' in FIGS. 4 and 5, respectively, are portions of the same curves shown in FIG. 2 illustrating the effect of adding and anionic Igepon T-33.

From FIGS. 3, 4, and 5 it is apparent that the addition of the anionic taurate surfactant to each of the nonionic surfactants resulted in the lowering of the observed minimum interfacial tension and that the interfacial tension for each multisurfactant system was lower than the interfacial tension for the corresponding single nonionic surfactant system throughout most of the salinity ranges measured. It can also be seen from an examination of FIGS. 3, 4, and 5 that the synergistic effect observed through the employment of the multicomponent surfactant system seems to decrease with increasing polyethylene oxide content of the nonionic surfactant. This decrease in interfacial tension reduction, based upon the data presented in FIGS. 3, 4, and 5, as a function of the polytheylene oxide content of the nonionic surfactant is shown quantitatively in FIG. 6.

Figure 6:
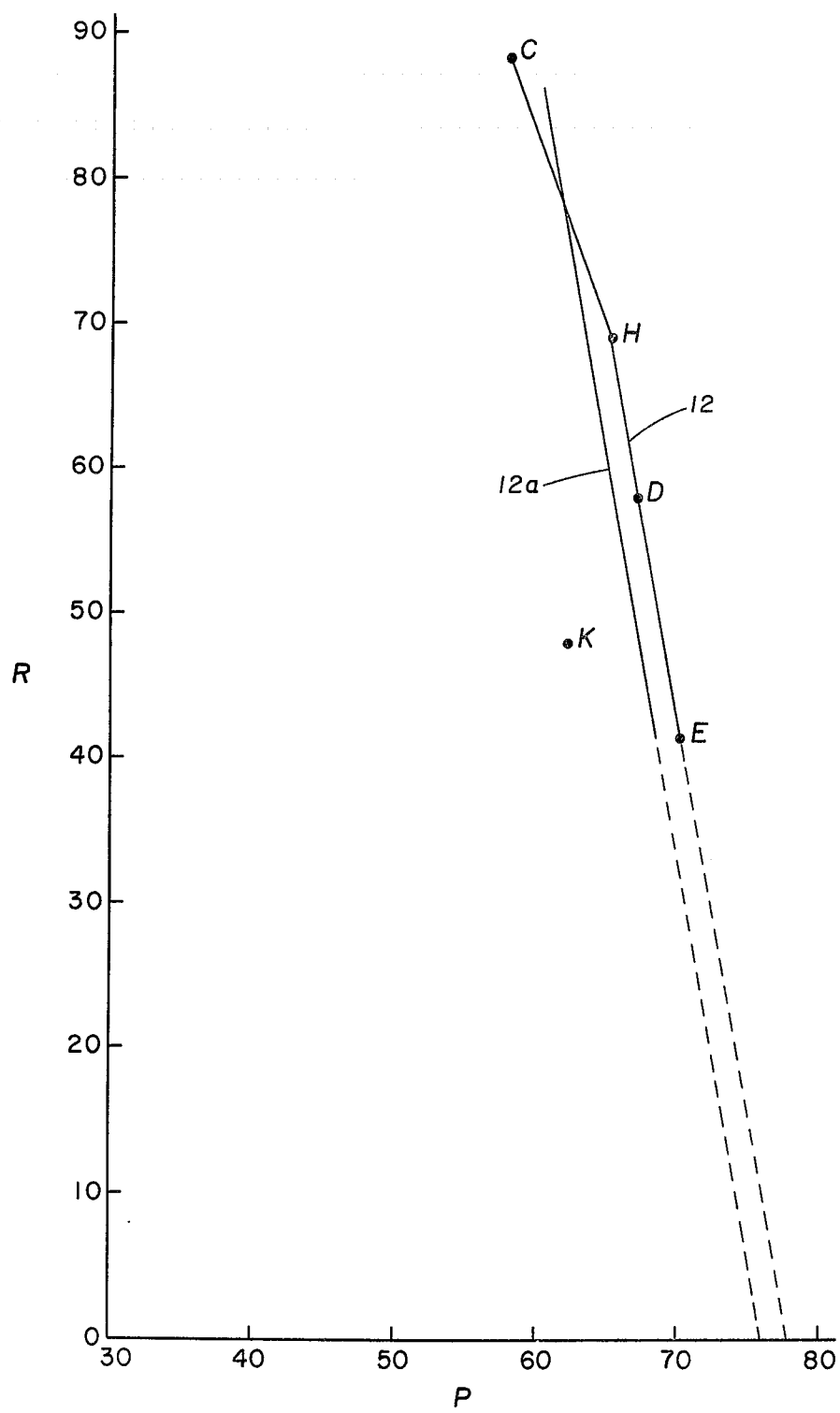
FIG. 6 is a graph illustrating the reduction in minimum interfacial tension achieved in accordance with the present invention as a function of the polyethylene oxide content of the nonionic component.

In FIG. 6 the reduction, R, in interfacial tension resulting from the addition of the anionic surfactant to form the multicomponent surfactant system is plotted on the ordinate versus the percent polyethylene oxide content, P, of the nonionic surfactant on the abscissa. The data points in FIG. 6 are indicated by the code letter of the nonionic surfactant employed in the system. The value of R is arrived at by dividing the area under the semilog interfacial tension-salinity curve for the nonionic surfactant alone into the difference between this area and the area under the corresponding semilog interfacial tension-salinity curve for the multifunctional system containing the nonionic surfactant and the anionic surfactant. Thus, for surfactant system E, for example, R is calculated by dividing the area under curve E" which extends from a salinity of 2 to 18 percent into the area bounded by curves E' and E" between salinities of 2 to 18 percent. Curve 12 in FIG. 6 is drawn directly through data points C, H, B, and E with no weight given to data point K. Curve 12A is an interpolative curve with weight given to all the data points. By extrapolation of both curves 12 and 12A as indicated by the broken line portions of these curves, it will be seen that a reduction in interfacial tension can be expected by employing an anionic surfactant in accordance with the present invention in combination with a nonionic surfactant exhibiting a polyethylene oxide content of up to 75 percent. Thus, it is preferred in carrying out the present invention that this be regarded as the maximum polyethylene oxide content of the nonionic surfactant.

Figure 7:
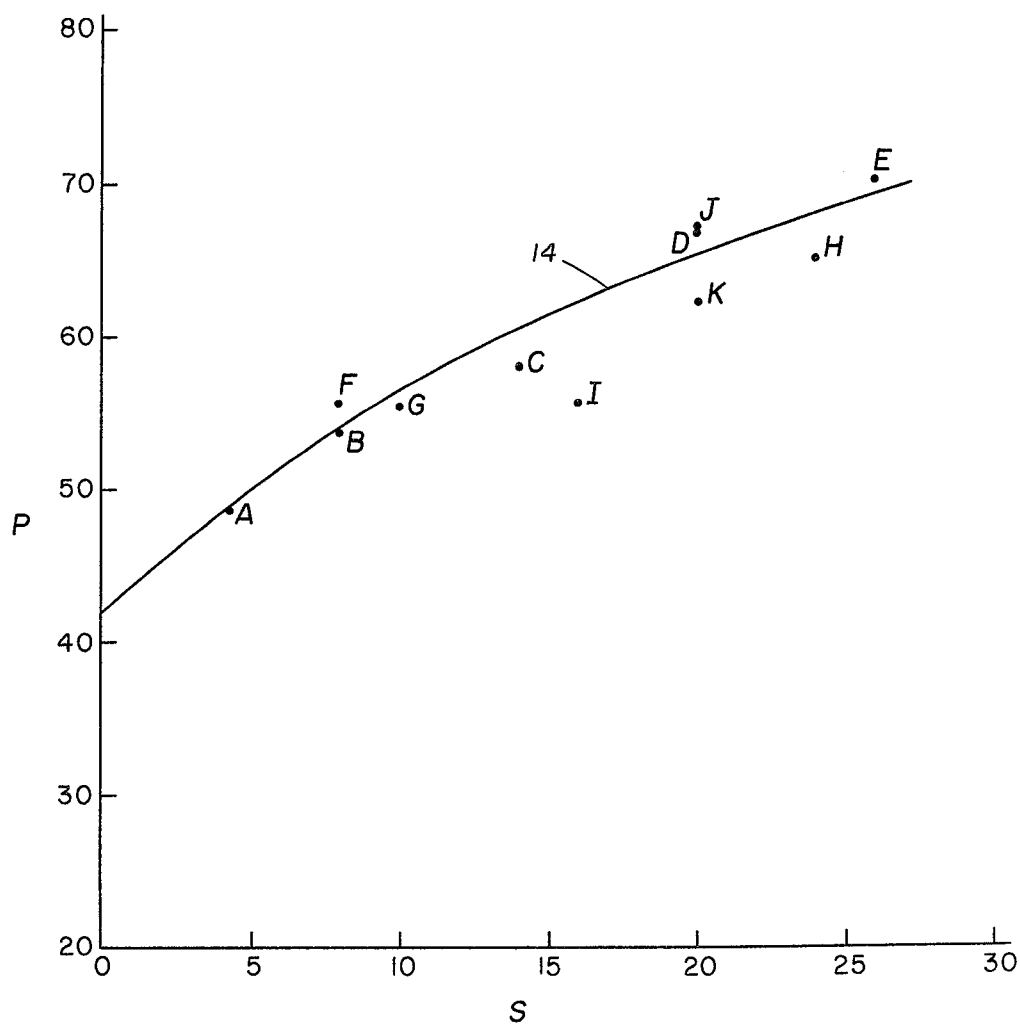
FIG. 7 is a graph illustrating the effect of the polyethylene oxide content of the nonionic surfactant on the salinity at which minimum interfacial tension occurs.

As noted previously in discussing the data presented in FIGS. 1 and 2, the salinity points of interfacial tension minima of the multicomponent surfactant systems of the present invention appear to increase with an increase in polyethylene oxide content of the nonionic surfactant. This characteristic is illustrated in FIG. 7 in which curve 14 is a plot of percent polyethylene oxide content, P, on the ordinate versus the percent total salinity, S, at which the lowest interfacial tension occurred for the multicomponent surfactant systems employing each of nonionic surfactants A through E. By extrapolating curve 14 for salinities less than about 4 percent, it would appear that the polyethylene oxide content of the nonionic surfactant in the multicomponent system should be no lower than 45 percent, a limitation imposed by the solubility of the nonionic surfactant in the aqueous phase.

Figure 8:
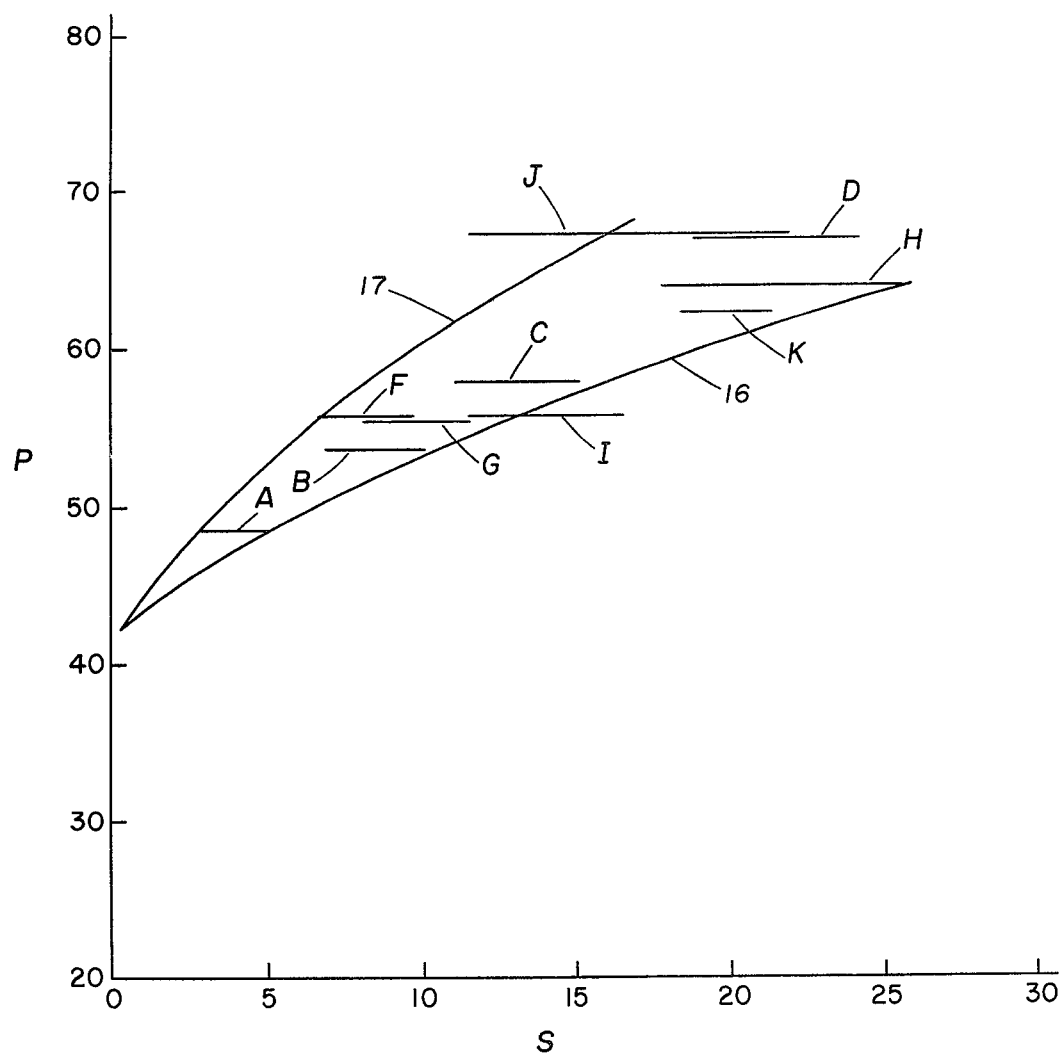
FIG. 8 is a graph illustrating the width of the salinity windows associated with the multicomponent surfactant systems of the present invention as a function of the polyethylene oxide content of the nonionic surfactant.

A somewhat similar conclusion would appear to follow from an examination of FIG. 8 which shows the width of the salinity window (interfacial tension of less than 0.003 dyne per centimeter) as a function of polyethylene oxide content of the nonionic surfactant and total salinity. In FIG. 8, the percent of polyethylene oxide content, P, is plotted on the ordinate and the percent total salinity, S, on the abscissa. Each of the horizontal lines A through D and F through K indicates the width and location of the salinity window for the multicomponent surfactant systems employing the nonionic surfactant designated by the code letter. Curve 16 in FIG. 8 is an interpolative curve showing the upper salinity window limit and curve 17 is an interpolative curve showing the lower salinity window limit. By extrapolation of curves 16 and 17, it would appear that the salinity window becomes progressively narrower at the lower salinities and lower polyethylene oxide content. FIG. 8 also indicates that blends of the various nonionic surfactants may be employed in order to arrive at different salinity windows. For example, a system in which the nonionic component is provided by surfactants C and G would be expected to result in a salinity window between the upper and lower limits associated with surfactants C and G, respectively.

As noted previously, carbonate-type reservoirs such as limestones and dolomites typically contain waters which have a high total salinity and also contain moderate to high concentrations of divalent ions. In order to determine the efficacy of the multifunctional surfactant systems of the present invention in carbonate reservoirs from the viewpoint of wettability, the oil-water contact angles against calcite were measured at the salinities for which interfacial tension measurements were taken. Highly favorable contact angles of 180° or near 180° (as measured through the oil phase) were observed for the multicomponent systems at most points within the salinity ranges at which the interfacial tension measurements were taken. With two exceptions, these highly favorable contact angles were observed for each surfactant system within the salinity window range at which the interfacial tensions were indicated to be less than 0.003 dyne/centimeter. The two exceptions occurred for the multicomponent system employing nonionic surfactant C at a salinity of 14 percent and the system employing surfactant D at a salinity of 22 percent. Even in these instances, reasonably favorable contact angles of 149° and 158° were observed. From the foregoing, it can be seen that surfactant systems of the present invention are particularly well adapted for use in carbonate reservoirs both from the standpoint of interfacial tensions in high salinities and divalent ion concentrations and from the standpoint of wettability of the reservoir surfaces.

To review the results of the previously described experiments, all of the nonionic surfactants tested exhibited a decrease in minimum interfacial tension when employed in conjunction with the amide-linked sulfonate anionic surfactant. The polyethylene oxide content of the surfactants tested ranged from a low of 48.7 percent for surfactant A to a high of 70.2 percent for surfactant E. From a review of FIGS. 6 and 7 it would appear that at least some reduction in interfacial tension may be expected where the polyethylene oxide content of the nonionic surfactant is within the range of 45 to 75 percent and it is preferred in carrying out the invention to observe these limitations. Preferably, the polyethylene oxide content of the nonionic surfactant is within a range of 48 to 68 percent since it is within this range that interfacial tension minima of 0.003 dyne per centimeter or lower were observed.

With respect to total salinity, the upper salinity window limit observed was approximately 25 weight percent with a corresponding divalent metal ion concentration of about 3.0 weight percent. Thus, it will be preferred in carrying out the invention to observe these maximum limitations both with respect to the salinity and the divalent metal ion concentration of the reservoir water and also of the flooding medium in which the surfactant system is employed. Where the salinity and divalent ion concentration exceed these values, the foregoing laboratory data would suggest the use of nonionic surfactants exhibiting a relatively high polyethylene oxide content approaching 75 percent.

The lower salinity window limit observed in terms of an interfacial tension of 0.003 dyne per centimeter or less was about 3.0 weight percent and this it will be preferred in carrying out the invention that the salinity of the surfactant slug and the reservoir water be equal to or greater than this value.

The corresponding divalent metal ion concentration in the mixed brine solution employed in the laboratory experiments is 0.35 weight percent. As decribed hereinafter, the presence of divalent metal ions is not necessary to the achievement of interfacial tensions of 0.003 dyne per centimeter or lower and the present invention may be carried out in reservoirs employing flooding waters which are free of divalent metal ions. However, a preferred application of the invention is in reservoirs, particularly carbonate-type reservoirs, in which the divalent metal ion concentration is about 0.03 weight percent or greater and in which the prior art anionic surfactant systems are usually not effective.

Laboratory experiments were also carried out to determine the interfacial activity of the multicomponent surfactant system of the present invention in the absence of divalent ions and also to determine the effects of varying the relative amounts of nonionic and anionic surfactants and of the presence of additional surfactant components. In each of these experiments, the nonionic surfactant employed was nonyl phenol polyethylene oxide identified in Table I by code letter C and exhibiting a polyethylene oxide content of 58 percent, approximately midway between the polyethylene oxide range of the various nonionic surfactants investigated.

Figure 9:
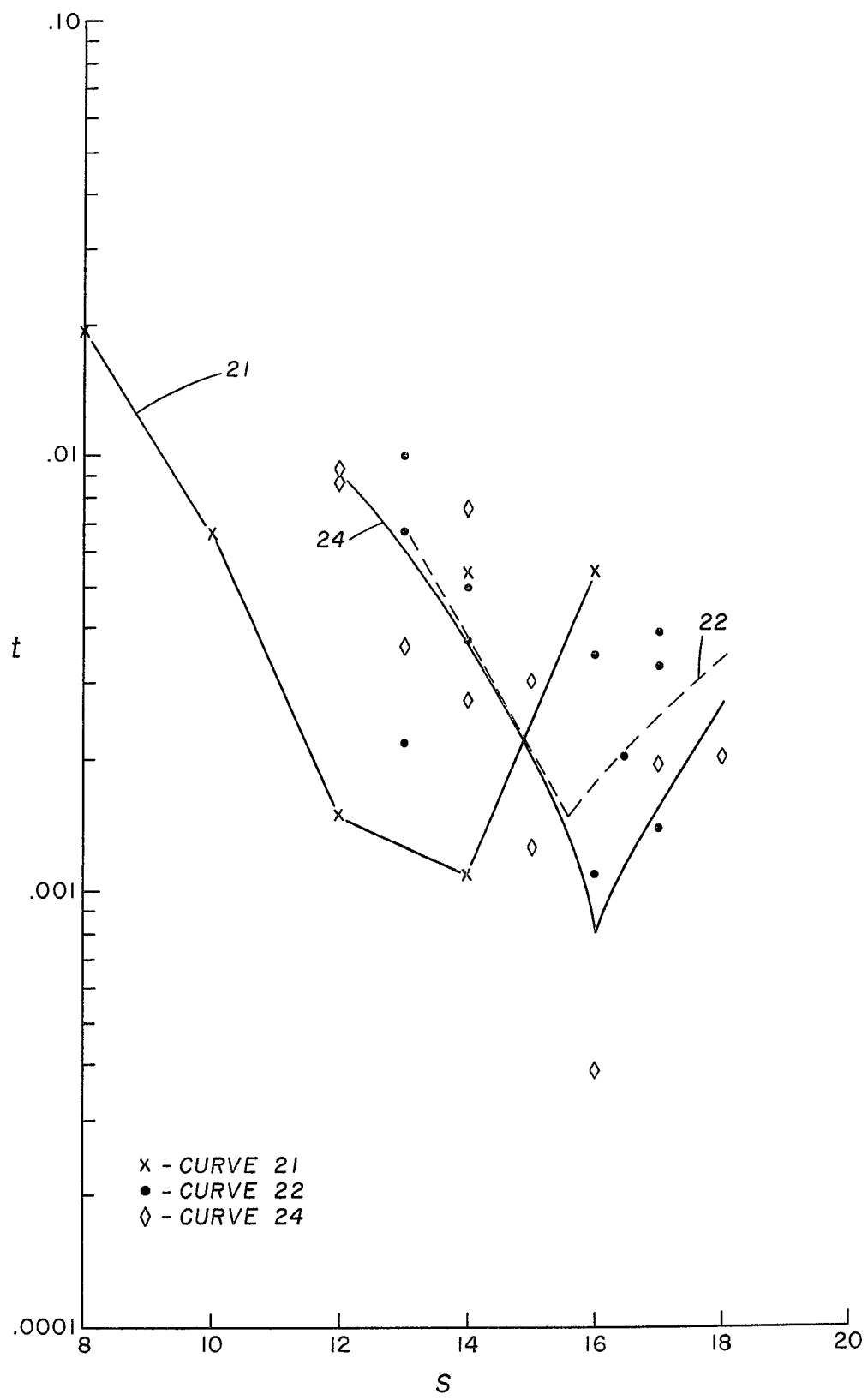
FIG. 9 is a graph illustrating interfacial tensions achieved by the surfactant system of the present invention in the presence of divalent ions compared to the absence of divalent ions.

FIG. 9 illustrates interfacial tensions achieved with multicomponent surfactant systems employing surfactant C in combination with the anionic surfactant T-33 for the mixed brine type of solution described previously and a brine in which the total salinity is due to sodium chloride with no divalent ions present. In FIG. 9, curves 21, 22, and 24 are semilog plots of interfacial tension, t, on the ordinate versus percent total salinity, S, on the abscissa. Curve 21 duplicates a portion of curve C shown in FIG. 1 where the surfactant system (0.02 weight percent nonionic surfactant C and 0.03 weight percent T-33) was dissolved in the mixed brine solution. Curve 22 is an interpolative curve for this same surfactant system in an aqueous medium where the salinity is provided solely by sodium chloride. As can be seen from comparison of curves 21 and 22, the presence of divalent ions is not necessary in order to achieve an interfacial tension of less than 0.003 dyne per centimeter. The effect of the divalent ions in solution seems to be to shift the interfacial tension minimum and the salinity window to a somewhat lower salinity, possibly due to the somewhat higher ionic strength caused by the presence of the divalent ions.

Curve 24 in FIG. 9 is a plot for a multicomponent surfactant system employing the aforementioned nonionic and anionic surfactants but in which the T-33 anionic surfactant is present in a concentration of 0.04 weight percent. The nonionic surfactant C is present in a concentration of 0.02 weight percent as before. As can be seen by a comparison of curves 22 and 24, the increase in concentration of T-33 is accompanied by a slight lowering of the interfacial tension minimum and a widening of the salinity window.

Figure 10:
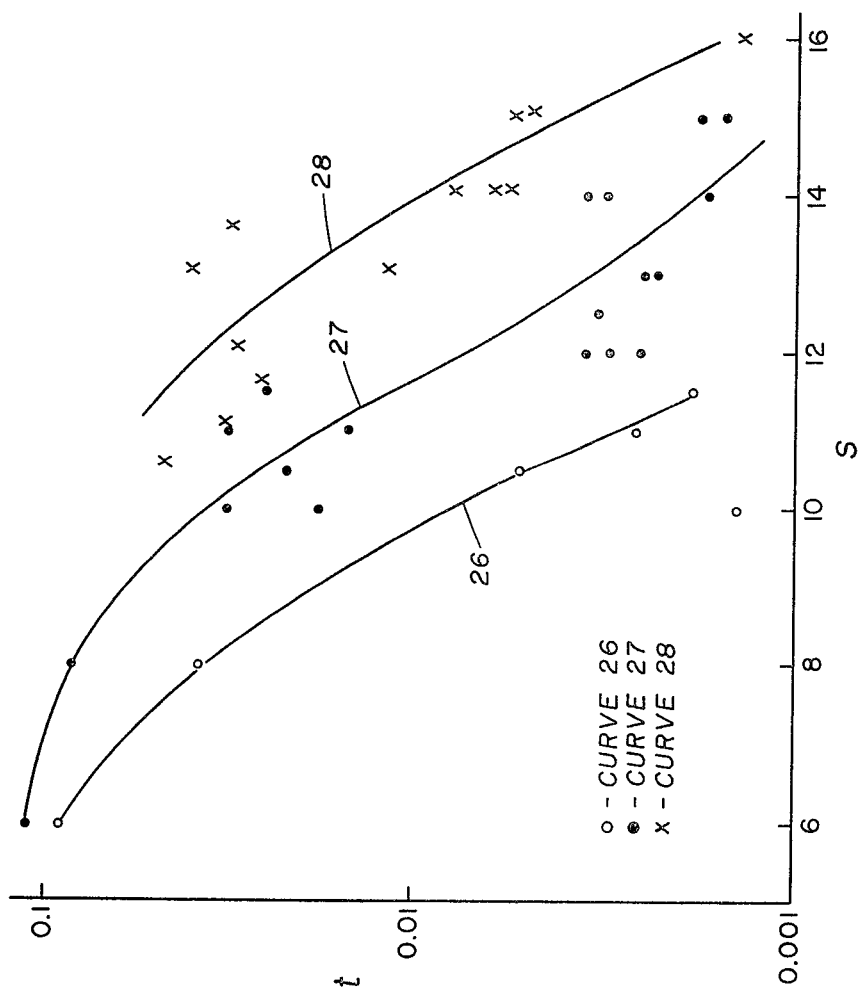
FIG. 10 is a graph illustrating the effect on interfacial tension of varying the relative amounts of the anionic and nonionic components of the surfactant system and also illustrating the effect of adding a second anionic surfactant.

FIG. 10 illustrates the results achieved by varying the relative concentrations of nonionic surfactant C and the anionic surfactant TK-32 sodium N-methyl-N-(tall oil acyl)-taurate and also shows the effect of addition of a second anionic surfactant. The second anionic surfactant employed in these experiments was a petroleum sulfonate available from the Witco Chemical Company under the tradename of Alconate A-80 or Petronate TRS 10-80. In each of these experiments, the aqueous medium employed contained sodium chloride and no divalent ions.

In FIG. 10, curve 26 is a semilog plot of interfacial tension, t, in ordinate versus salinity, S, for a surfactant system comprising 0.03 weight percent nonionic surfactant C, 0.03 weight percent anionic surfactant TK-32, and 0.01 weight percent of the anionic petroleum sulfonate A-80. Curve 27 illustrates the results for a surfactant system comprising these same components present in concentrations of 0.03, 0.04, and 0.01 weight percent, respectively; and curve 28 shows the results achieved with a surfactant system in which these same components were present in concentrations of 0.02, 0.05, and 0.01 weight percent, respectively.

FIG. 10, consistent with the results shown in FIG. 9, indicates that by increasing the relative concentration of the anionic surfactant TK-32 the interfacial tension minimum is moved to somewhat higher salinities. The presence of the petroleum sulfonate appeared to have no significant effect upon the interfacial tensions achieved. However, the petroleum sulfonate did appear to cause relatively poor contact angles in some instances for systems depicted by curves 26 and 27. This reduction in contact angle was not as pronounced in the surfactant system associated with curve 28 where the petroleum sulfonate constituted a lower relative amount of the total anionic surfactant components. It would seem therefore that care should be exercised in adding petroleum sulfonates or other anionic surfactants to the systems of the present invention particularly where carbonate reservoirs and high salinities are involved.

In the various experiments carried out in regard to the invention, the total concentration of the nonionic polyethylene oxide surfactant and the anionic taurine surfactant varied between 0.05 to 0.08 weight percent, calculated on the basis of active amounts of surfactants. However, in actual operations the total surfactant concentration should be significantly higher in order to accommodate the effects of adsorption of surfactants onto the reservoir surfaces and dispersion of surfactants into the reservoir waters. In most cases it will be preferred to employ the multicomponent surfactant system in a concentration within the range of 1.5 to 5.0 weight percent. Somewhat higher concentrations may be employed in certain circumstances such as where surfactant adsorption is especially severe. Caution should be exercised in using concentrations significantly above 5 percent since these may lead to turbidity in the aqueous phase with an attendant plugging of the formation.

The relative amounts of the nonionic and anionic surfactant components may vary. Preferably, the weight ratio of the nonionic surfactant to the anionic surfactant will be within the range of 1:4 to 4:1.

As taught, for example, in the aforementioned U.S. Pat. No. 3,474,864 to Hurd, surfactants as well as other solutes are subject to adsorption upon the rock surfaces within the reservoir and thus move through the reservoir by a chromatographic adsorption-desorption process. Since the rate of desorption is less than the rate of adsorption, the surfactants are transported through the reservoir at a rate lower than that of the aqueous carrier fluid. Thus, in accordance with the teachings of this patent, a surfactant slug may be followed by a driving fluid of a somewhat lower salinity in order to increase the desorption of previously adsorbed surfactants.

The present invention, because of the relatively high salinities which may be employed and the relatively wide salinity windows achievable, is particularly well adapted to the use of this technique. Thus, in a preferred embodiment of the invention, the aqueous flooding medium injected subsequent to the slug containing the multicomponent surfactant system exhibits a total salinity lower than the total salinity of the surfactant slug. In carrying out this embodiment of the invention, the salinities of the surfactant slug and the subsequently injected chase slug preferably are both within the salinity window of the surfactant system employed. For example, when employing the system depicted by curve C' in FIG. 1, the salinity of the surfactant slug may be near the upper limit of the salinity window at about 15 percent and the salinity of the chase slug may be near the lower limit at about 11 percent.

The present invention may be carried out in conjunction with the use of a thickening agent added for mobility control purposes. The thickening agent may be added to the aqueous solution containing the multicomponent surfactant system or may be injected in a separate mobility control slug. Normally the thickening agent will be present in a separate mobility control slug injected immediately after the slug containing the multicomponent surfactant system. The thickening agent may be added in concentrations such as to provide a graded increase in viscosity at the front end of the slug and a graded decrease in viscosity at the trailing edge of the mobility control slug, or the thickening agent concentration may be relatively constant throughout. Typically, the viscosity of at least a portion of the mobility control slug will be within the range of about 1 to 4 times the viscosity of the reservoir oil Various thickening agents may be employed to increase the viscosity or apparent viscosity of the mobility control slug and include such natural materials as guar gum or karaya gu, or such synthetic products as the polysaccharide B-1459 available from the Kelco Chemical Co. under the trade name "Kelzan", poly(-glucosylglucan)s such as disclosed in U.S. Pat. No. 3,372,749 to Williams and available from the Pillsbury Company under the trade name "Polytran", or the partially hydrolyzed polyacrylamides available from the Dow Chemical Company under the trade name "Pusher Chemicals". An ionic polysaccharide such as Kelzan usually will be preferred as the thickening agent since only relatively small quantities, normally 250 to 2500 ppm, are necessary to impart the desired viscosity to the water and it retains its viscosity-enhancing characteristics even in the presence of high concentrations of divalent ions.

Figure 11:
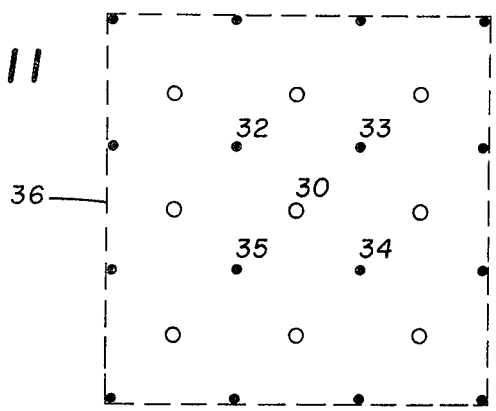
FIG. 11 is an illustration exhibiting one type of well pattern which may be employed in carrying out the invention.

The present invention may be carried out utilizing injection and production systems as defined by any suitable arrangement of wells. One well arrangement commonly used in waterflooding operations and suitable for use in carrying out the present invention is an integrated five-spot pattern of the type illustrated in FIG. 11. In this Figure, the legend O is used to indicate a production well and the legend ● is used to indicate an injection well. As shown in FIG. 11, this integrated pattern comprises a plurality of five-spot patterns, each of which comprises a central production well as indicated by reference character 30 and four peripheral injection wells as indicated by reference numerals 32, 33, 34, and 35. The term "pore volume", as used herein to define the quantities of fluids injected in carrying out the invention, designates the pore volume of the formation underlying the well pattern defined by the wells comprising the injection and production systems. Thus the term pore volume as used with reference to the pattern shown in FIG. 11 is the pore volume of that portion of the formation underlying the area enclosed by broken line 36.

Of course, other well arrangements may be used in carrying out the present invention such as the direct or staggered line drive patterns, the four-spot, seven-spot, or nine-spot patterns, or circular flood patterns. For further description of these and other well arrangements which may be employed in waterflooding, reference is made to Calhoun, J. C., Jr., FUNDAMENTALS OF RESERVOIR ENGINEERING, Univ. of Oklahoma Press, Norman (1960), pp. 371–376, and Uren, L. C., PETROLEUM PRODUCTION ENGINEERING - OIL FIELD EXPLOITATION, McGraw-Hill Book Co., Inc., New York, Toronto and London (1953), pp. 528–534. It is to be recognized also that the invention may be carried out utilizing dually completed injection-production wells of the type disclosed, for example, in U.S. Pat. No. 2,725,106 to Spearow. This arrangement may sometimes be utilized to advantage in relatively thick reservoirs in which it is desirable to displace the oil in the reservoir upwardly and recover the oil from the upper portion of the reservoir.

With respect to the quantities of the displacing fluids employed in the present invention, the aqueous solution containing the multicomponent surfactant system preferably is injected in an amount of at least 0.1 pore volume. Typically the size of this surfactant slug will be within the range of 0.1 to 0.3 pore volume. Where a relatively viscous mobility control slug is employed, it normally will be injected immediately after the surfactant solution in an amount within the range of 0.1 to 0.3 pore volume. Preferably, the salinity of this subsequently injected slug will be lower than the salinity of the surfactant slug, as described previously. Subsequent to the injection of this slug, a driving fluid is injected in order to displace the previously injected fluids through the formation. The driving fluid typically may be any water which is locally available and is not incompatible with the formation, and in injected in such an amount as is necessary to carry the displacement process to its conclusion.

I claim:
1. In the recovery of oil from a subterranean oil reservoir penetrated by spaced injection and production systems, the method comprising:

a. introducing into said reservoir via said injection system an aqueous solution of a multifunctional surfactant system comprising a surface-active amide linked sulfonate anionic group and a surface-active polyethylene oxide nonionic group,
b. introducing into said reservoir via said injection system an aqueous flooding medium to displace reservoir oil to said production system, and
c. recovering oil from said production system.

2. The method of claim 1 wherein said aqueous surfactant solution has a first salinity and at least a portion of the aqueous flooding medium injected subsequent to said aqueous surfactant solution has a second salinity which is lower than said first salinity.

3. The method of claim 2 wherein said first and second salinities are within the upper and lower limits of a salinity window range within which the interfacial tension between the aqueous surfactant solution and reservoir oil is less than 0.003 dyne per centimeter.

4. The method of claim 1 wherein said aqueous surfactant solution has a salinity within the range of 3 to 25 weight percent.

5. The method of claim 4 wherein said aqueous surfactant solution has a divalent metal ion concentration of at least 0.03 weight percent.

6. The method of claim 1 wherein said subterranean oil reservoir contains water having a salinity within the range of 3 to 25 weight percent.

7. The method of claim 6 wherein the water in said subterranean oil reservoir has a divalent metal ion concentration of at least 0.03 weight percent.

8. The method of claim 1 wherein said subterranean oil reservoir comprises a carbonate rock formation containing water having a salinity within the range of 3 to 25 weight percent and a divalent metal ion concentration within the range of 0.03 to 3.0 weight percent.

9. In the recovery of oil from a subterranean oil reservoir penetrated by spaced injection and production systems, the method comprising:
a. introducing into said reservoir via said injection system an aqueous solution of a multifunctional surfactant system comprising a nonionic surfactant characterized by the formula:

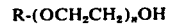

wherein R is an aliphatic group or an aliphatic substituted aryl group and $n$ is a number equal to or greater than 3, and an anionic surfactant characterized by the formula:

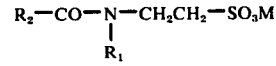

wherein
$R_1$ is a methyl or ethyl group,
$R_2$ is an aliphatic group containing 12 to 20 carbon atoms, and
M is an alkali metal or ammonium ion,
b. introducing into said reservoir via said injection system an aqueous flooding medium to displace reservoir oil to said production system, and
c. recovering oil from said production system.

10. The method of claim 9 wherein the ethylene oxide content of said nonionic surfactant is within the range of 45 to 75 percent.

11. The method of claim 10 wherein said aqueous surfactant solution has a first salinity and at least a portion of the aqueous flooding medium injected subsequent to said aqueous surfactant solution has a second salinity which is lower than said first salinity.

12. The method of claim 10 wherein said aqueous surfactant solution has a salinity within the range of 3 to 25 weight percent.

13. The method of claim 12 wherein said aqueous surfactant solution has a divalent metal ion concentration of at least 0.03 weight percent.

14. The method of claim 10 wherein said subterranean oil reservoir contains water having a salinity within the range of 3 to 25 weight percent.

15. The method of claim 14 wherein the water in said subterranean oil reservoir has a divalent metal ion concentration of at least 0.03 weight percent.

16. The method of claim 10 wherein said subterranean oil reservoir comprises a carbonate rock formation containing water having a salinity within the range of 3 to 25 weight percent and a divalent metal ion concentration within the range of 0.03 to 3.0 weight percent.

17. The method of claim 10 wherein the weight ratio of said nonionic surfactant to said anionic surfactant is within the range of 1:4 to 4:1.

18. The method of claim 10 wherein the ethylene oxide content of said nonionic surfactant is within the range of 48 to 68 percent.

19. The method of claim 18 wherein said anionic surfactant is selected from the group consisting of alkali metal and ammonium N-methyl-N-oleoyl-taurate and alkali metal and ammonium N-methyl-N-(tall oil acyl)-taurate.

20. The method of claim 19 wherein said anionic surfactant is selected from the group consisting of sodium N-methyl-N-oleoyl-taurate and sodium N-methyl-N-(tall oil acyl)-taurate.

21. The method of claim 11 wherein said first and second salinities are within the upper and lower limits of a salinity window range within which the interfacial tension between the aqueous surfactant solution and reservoir oil is less than 0.003 dyne per centimeter.

* * * * *